(12) United States Patent
Van Gorkom

(10) Patent No.: US 6,908,217 B2
(45) Date of Patent: Jun. 21, 2005

(54) DISPLAY DEVICE COMPRISING A LIGHT GUIDE

(75) Inventor: Gerardus G. P. Van Gorkom, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 326 days.

(21) Appl. No.: 10/347,569

(22) Filed: Jan. 17, 2003

(65) Prior Publication Data

US 2003/0141800 A1 Jul. 31, 2003

Related U.S. Application Data

(63) Continuation of application No. 09/510,142, filed on Feb. 22, 2000, now Pat. No. 6,528,937.

(30) Foreign Application Priority Data

Feb. 24, 1999 (EP) .............................................. 99200521

(51) Int. Cl.$^7$ .............................. F21K 27/00; H01K 1/26
(52) U.S. Cl. ........................ 362/260; 313/112; 313/489; 349/71

(58) Field of Search ................... 362/84, 260; 313/110, 313/111, 484, 485, 489, 112; 349/71; 345/47, 75.1

(56) References Cited

U.S. PATENT DOCUMENTS

| | | | | |
|---|---|---|---|---|
| 4,822,144 A | * | 4/1989 | Vriens | 349/71 |
| 5,396,406 A | * | 3/1995 | Ketchpel | 362/27 |
| 5,608,554 A | * | 3/1997 | Do et al. | 349/70 |
| 5,666,174 A | * | 9/1997 | Cupolo, III | 349/64 |
| 5,926,239 A | * | 7/1999 | Kumar et al. | 349/69 |
| 6,147,456 A | * | 11/2000 | Janning | 315/169.3 |
| 6,717,348 B2 | * | 4/2004 | Takahashi | 313/483 |

* cited by examiner

Primary Examiner—Thomas M. Sember
Assistant Examiner—Jacob Y. Choi

(57) ABSTRACT

A display device includes an ultraviolet light (UV light) source, a light guide; a movable element; phosphor elements, including phosphor particles in an embedding material, that emit visible light at different colors when excited by UV light; and electrodes arranged so that electric voltage applied to the electrodes can generate an electric field to move the movable element into contact with the light guide to couple light out of the light guide.

14 Claims, 4 Drawing Sheets

DISPLAY DEVICE COMPRISING A LIGHT GUIDE

CROSS REFERENCE TO RELATED APPLICATIONS

This is a continuation of application Ser. No. 09/510,142, filed Feb. 22, 2000 now U.S. Pat. No. 6,528,937.

FIELD OF TECHNOLOGY

The invention relates to a display device with a light source and a display part comprising a light guide, a movable element and selection means to locally and selectively bring said movable element into contact with the light guide to couple light out of the light guide.

BACKGROUND AND SUMMARY

A display device of the type mentioned in the opening paragraph is known from U.S. Pat. No. 4,113,360.

In said patent, a description is given of a display device comprising a first plate of a fluorescent material, in which, in operation, light is generated and trapped (so that this plate forms a light guide), a second plate which is situated at some distance from the first plate and, between said two plates, a movable element in the form of a membrane. By applying voltages to addressable electrodes on the first and second plates and to electrodes on the movable element, the movable element can be locally brought into contact with the first plate, or the contact can be interrupted. A transparent contact liquid is present on the contact surfaces. At locations where the movable element is in contact with the first plate, light is decoupled from said first plate. This enables an image to be represented. If the movable element is not in contact with the light guide, it is in contact with the second plate.

Contrast is a very important parameter by which the quality of a display can be judged. Light which is incident on the display screen of the display is reflected and reduces the visibility of, or blurs the image displayed on the display screen. Simplicity of design is also an important parameter.

It is an object of the invention to increase the contrast of the image displayed by the display part and yet to provide a relatively simple design.

To this end, the display device in accordance with a first aspect of the invention comprises a source for UV radiation, the movable element comprises means for scattering UV light, the display device comprises phosphor elements for emitting visible light at different colors when excited by UV radiation, and the phosphor elements comprise phosphor particles in an embedding material. Preferably, the phosphor particles have an average size a smaller than $\lambda/\pi$, most preferably between $\lambda/6\pi$ and $\lambda/2\pi$.

By using UV excitable phosphor elements for generating different colors, it is possible to generate a color image. When the movable element is in contact with the light guide, the scattering centers in the movable element scatter the UV light out of the light guide, which UV light excites a phosphor element. The use of phosphors emitting different colors provides a color display device which uses a single type of light source. It is not necessary to use three different types of light sources (one for each color) or to use color filters for extracting colored light from white light, which inevitably results in appreciable losses of intensity.

By placing the phosphor particles in an embedding material (also called matrix), the scattering of all light including visible light by the phosphor element is reduced when using phosphor particles in the usual powder form. The difference in index of refraction between the phosphor particles and its surrounding medium is decreased, which reduces the scattering. In the preferred embodiment, the average size is small (smaller than $\lambda/\pi$, most preferably between $\lambda/6\pi$ and $\lambda/2\pi$) which reduces the scattering. The UV absorption is roughly proportional to $a/\lambda$, whereas the scattering is much more strongly reduced as the size of the particles decreases. In the indicated range for the size of the phosphor particles, an efficient UV absorption is combined with a strongly reduced visible light scattering efficiency.

In a second aspect of the invention, the display device comprises a source for UV radiation, the movable element comprises particles for scattering light in an embedding material, and the display device comprises phosphor elements for emitting visible light at different colors when excited by UV radiation, the particles for scattering UV light in the embedding material having a scattering efficiency for the UV radiation emitted by the source, which is larger than the scattering efficiency for light in the visible range, preferably at least twice larger.

Within the framework of the invention the scattering efficiency of light in the visible range is considered to be the scattering efficiency for green light to which the human eye is most sensitive.

The inventors have realized that the nature of the particles for scattering may pose a problem in relation to contrast. Light incident on the scattering particles is in part scattered back to the viewer, which reduces the contrast. Scattering particles in a powder form or when placed on a surface scatter light in a wide range of frequencies. A second aspect of the invention provides scattering particles which have an appreciably larger scattering efficiency in the UV region than for visible light. Thus, the UV light is coupled out of the light guide by scattering in an efficient manner, and yet incident light is much less efficiently scattered.

In preferred embodiments, the average size a of the scattering particles in the movable element is smaller than $\lambda/\pi$, where $\lambda$ is the wavelength of the UV radiation emitted by the source. For UV sources emitting UV light in lines, 'the wavelength' is the most prominent component of the spectrum emitted by the source. For UV sources emitting a continuous spectrum, 'the wavelength' is the peak of the continuous spectrum. For particles, the scattering efficiency (when in a matrix) is reduced sharply (roughly by a factor of $(a/\lambda)^k$ (k between 2 and 4)) for wavelengths larger than a. If e.g. $\lambda=380$ nm and $a/\lambda<<1$, then $k=4$ and the scattering efficiency for green light ($\lambda=550$ nm) is a factor of 4.4 less than that for UV. Preferably, at least 90% of the particles is smaller than $\lambda/\pi$. The most preferred range for the average particle size a lies between $\lambda/6\pi$ and $\lambda/2\pi$. If the particles become smaller than $\lambda/6\pi$, the scattering efficiency for UV light decreases strongly. The reduced scattering can be overcome by increasing the number of particles (the density of the particles). This may lead, however, to agglomeration of the particles, the agglomerates forming, in effect, particles of a much larger size, for which the visible light scattering efficiency may be high.

In embodiments of the invention as regards its second aspect, the difference in index of refraction of the scattering particles and the embedding material is larger in UV than in visible light, preferably at least $\sqrt{2}$ larger. The larger the difference in index of refraction, the greater the scattering. By choosing scattering particles and embedding materials for which the difference in index of refraction is larger in UV than in visible light, the ratio of the scattering efficiencies in UV and in visible light is larger than one, thus increasing contrast.

To increase contrast and yet provide an even simpler design, the display device in accordance with a third aspect of the invention comprises a source for UV radiation, and the movable element comprises phosphor particles for emitting visible light at different colors when excited by UV radiation. Preferably, the phosphor particles are embedded in the material of the movable element. In preferred embodiments, the phosphor particles have an average size which is smaller than $\lambda/\pi$, where $\lambda$ is the wavelength of the UV radiation emitted by the source. Preferably, the phosphor particles have an average size between $\lambda/6\pi$ and $\lambda/2\pi$.

By providing the phosphor particles directly in or on the movable element, the design is simplified, because separate phosphor-comprising elements need no longer be used. Compared to embodiments in which the UV light is scattered in the movable element, exits this element and thereafter impinges on phosphor elements, no scattering particles are needed, which reduces the scattering of visible light, and more of the UV light can be used for exciting the phosphors, thus reducing the amount of phosphor material needed and thus further reducing scattered light by reducing the light scattered by the phosphor particles. By embedding the phosphor particles in the material of the movable element, scattering of visible light is further reduced. The indicated size ranges provide an even further reduced scattering of visible light.

BRIEF DESCRIPTION OF THE DRAWING FIGURES

These and other aspects of the invention are apparent from and will be elucidated with reference to the embodiments described hereinafter. In the drawings.

The Figures are schematic and not drawn to scale, and, in general, like reference numerals refer to like parts.

DETAILED DESCRIPTION

Figure 1:
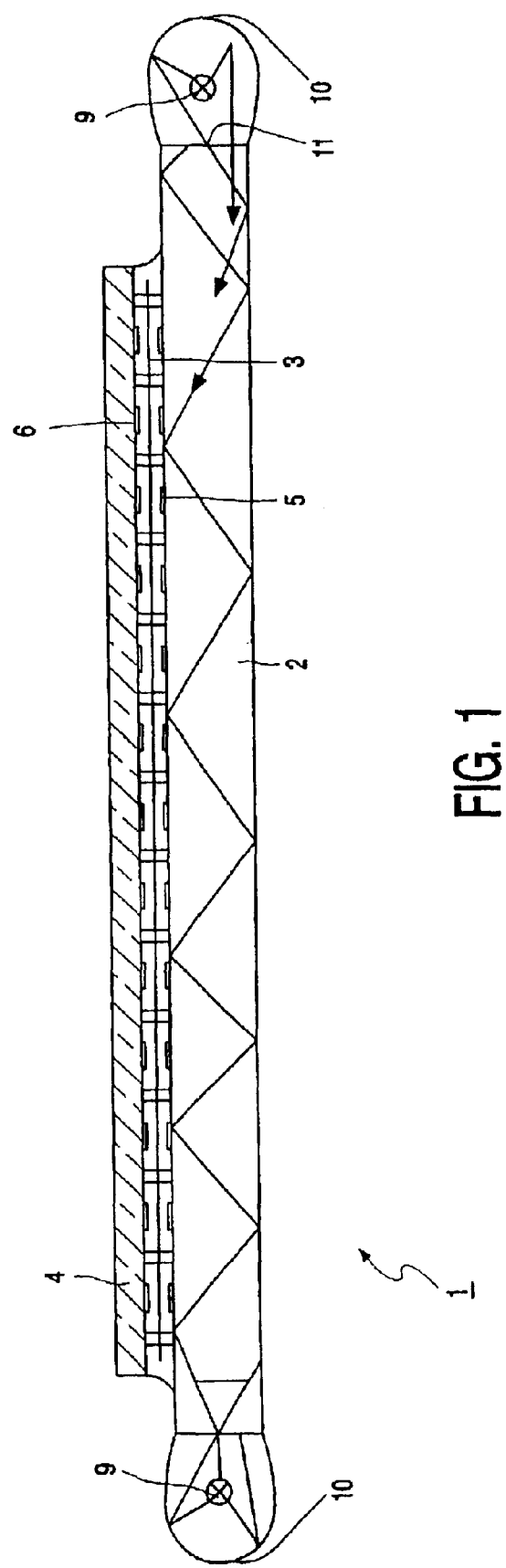
FIG. 1 is a cross-sectional view of a display device in accordance with the invention.
Figure 2:
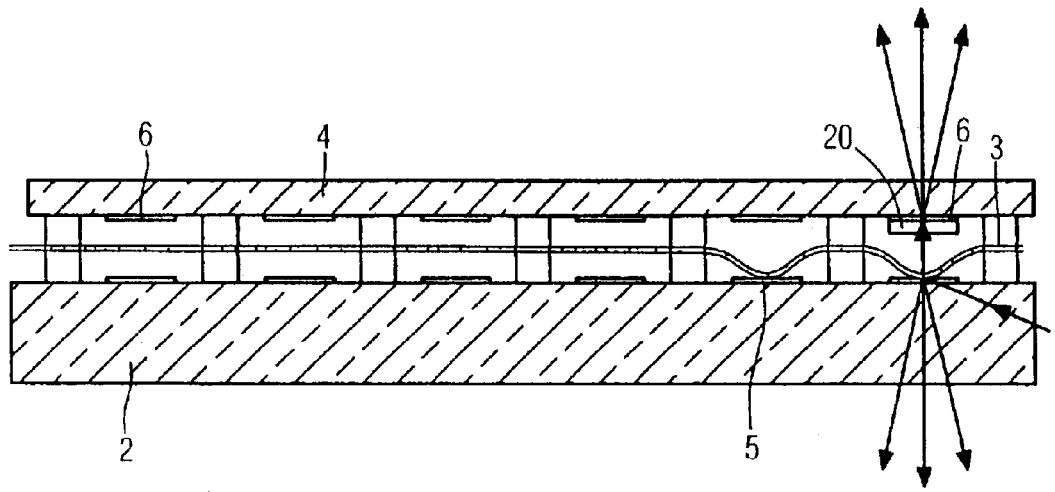
FIG. 2 shows a detail of the display device shown in FIG. 1.

FIG. 1 schematically shows a display device 1 in accordance with the invention. Said display device comprises a light guide 2, a movable element 3 and a second plate 4. Electrode systems 5 and 6 are arranged, respectively, on the sides of the light guide 2 and the second plate 4 facing the movable element 3. By locally generating a potential difference between the electrodes 5, 6 and the movable element 3, by applying, in operation, electric voltages to the electrodes and the movable element forces are locally exerted on the movable element, which pull the movable element against the light guide or keep it at a distance from the light guide, preferably against the second plate 4. The display device further comprises a light source 9 which in operation emits UV light. Reflectors 10 are provided. FIG. 2 shows how the movable element 3 lies against the light guide 2. In this state, a portion of the UV light enters the movable element. In this movable element, the UV light is scattered, so that part of the UV light leaves the display device. The light may exit at both sides or at one side. In FIG. 2, this is indicated by means of arrows. The display device comprises color-determining phosphor elements 20. UV light leaves the light guide at the addressed position, enters movable element 3, is scattered, and at least part of the UV light leaves the movable element and is incident on phosphor elements. The phosphor elements, excited by the UV light, emit colored light. The use of UV light and phosphor elements increases the efficiency of the display device.

Using a UV light source and phosphor elements which, when excited by UV light, emit light of different colors has the advantage that only a single type of light source needs to be used, and it is not necessary to use absorbing color filters for converting white light into colored light of a particular color by absorbing other colors. Such color filters result in an appreciable loss of efficiency.

Within the concept of the invention it is possible and even preferred to use light filters or light-filtering elements. However, such preferred light filters would mainly absorb light outside the relevant color range for phosphor elements, so that the contrast and/or the color point of the emitted light can be improved. For example, a red light-emitting phosphor element may be provided with a color filter for absorbing green and/or blue light. This has the advantage that the contrast is improved because most of the incident light is absorbed while the emitted light intensity is hardly reduced. Likewise, a blue light-emitting phosphor element may be provided with green and/or red light-absorbing material. Such color filters may comprise added absorbing layers or absorbing materials (such as pigments) added to the phosphor elements. If absorbing layers are used, the phosphor elements are positioned between the absorbing layer and the movable element. The UV light does not pass the absorbing layer. Absorption of UV light (with resulting loss of efficiency) does not occur. In contrast, absorbing materials in the phosphor elements (especially blue light-absorbing materials) may cause appreciable absorption of UV light.

Figure 3:
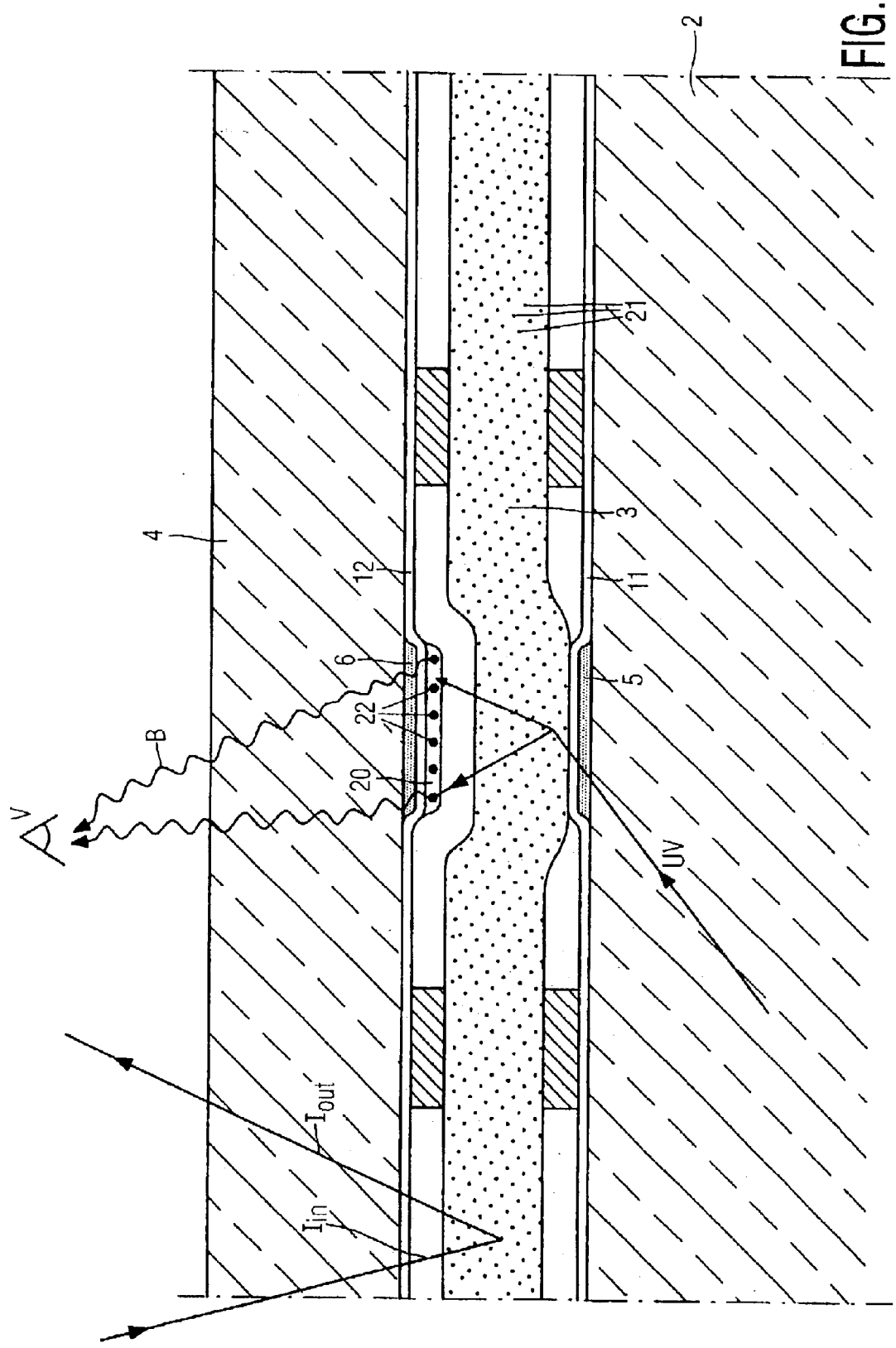
FIG. 3 illustrates scattering of UV light in the movable element, which impinges on a separate phosphor element.

FIG. 3 shows in more detail a movable element 3 and alight guide 2. When the movable element makes contact with an insulating layer 11 on electrode 5, UV light is capable of entering the movable element 3. The UV light is scattered by scattering particles 21 in the matrix (for instance a polymer matrix) of the movable element 3. The scattered UV light exits the movable element 3 and a portion of it impinges on phosphor element 20 which comprises a UV excitable phosphor, which emits visible light upon excitation, in this example blue light B seen by viewer V. The intensity of the light emitted by the phosphor element is dependent on the efficiency with which the UV light is scattered by the particles 21. Apart from scattering the UV light, the phosphor elements as well as the UV scattering particles may, however, also scatter incident light $I_{in}$, resulting in a scattered light intensity $I_{out}$. This scattered light reduces the contrast of the displayed image. Scattering particles in the form of a powder (for instance, a powder layer) on movable element 3 have a high visible light scattering efficiency. Such layers are in effect approximately white scattering layers, i.e. scattering equally well at all wavelengths. By having scattering particles in an embedding material, such as—but not restricted to—a polymer layer, the ratio of the scattering efficiency for UV light and for visible light can be appreciably higher than one, preferably above two.

In a first aspect of the invention, the phosphor elements 20 comprise phosphor particles 22 in an embedding material, the phosphor particles preferably having an average size smaller than $\lambda/\pi$, most preferably between $\lambda/6\pi$ and $\lambda/2\pi$.

By placing the phosphor particles in an embedding material, for instance a polymer matrix, the scattering of all light including visible light is reduced when using phosphor particles in a powder form. The difference in index of refraction between the phosphor particles and its surroundings is decreased, which reduces the scattering. Preferably, the matrix in which the phosphor particles are embedded has a high index of refraction in visible light (higher than 1.5, preferably higher than 1.8, more preferably substantially equal to the index of refraction of the phosphor particles). Furthermore, because they are in a matrix, agglomeration of particles is reduced and thus decreases the effective size distribution which positively influences the scattering. The UV absorption is roughly dependent on $a/\lambda$. In the indicated range for the size of the phosphor particles, an efficient UV absorption is combined with a strongly reduced visible light-scattering efficiency.

The contrast can also be improved additionally or separately if in particular the average size a of the scattering particles is smaller than $\lambda/\pi$, where $\lambda$ is the wavelength of the UV radiation emitted by the source. For UV sources emitting UV light in lines, 'the wavelength' is the most prominent component of the spectrum emitted by the source. For UV sources emitting a continuous spectrum, 'the wavelength' is the peak of the continuous spectrum. For particles, the scattering efficiency (when in a matrix) is reduced sharply (roughly by a factor of $(a/\lambda)^k$ (k between 2 and 4)) for wavelengths larger than a. For $a<<\lambda/2\pi$, the scattering efficiency is proportional to $(a/\lambda)^4$. Preferably, at least 90% of the particles is smaller than $\lambda/\pi$. The most preferred range for the average particle size a lies between $\lambda/6\pi$ and $\lambda/2\pi$. If the particles become smaller than $\lambda/6\pi$, the scattering efficiency for UV light becomes small. The reduced scattering can be overcome by increasing the number of particles (the density of the particles). This may lead, however, to agglomeration of the particles, the agglomerates forming, in effect, particles of a much larger size, for which the visible light-scattering efficiency may be high.

Figure 4:
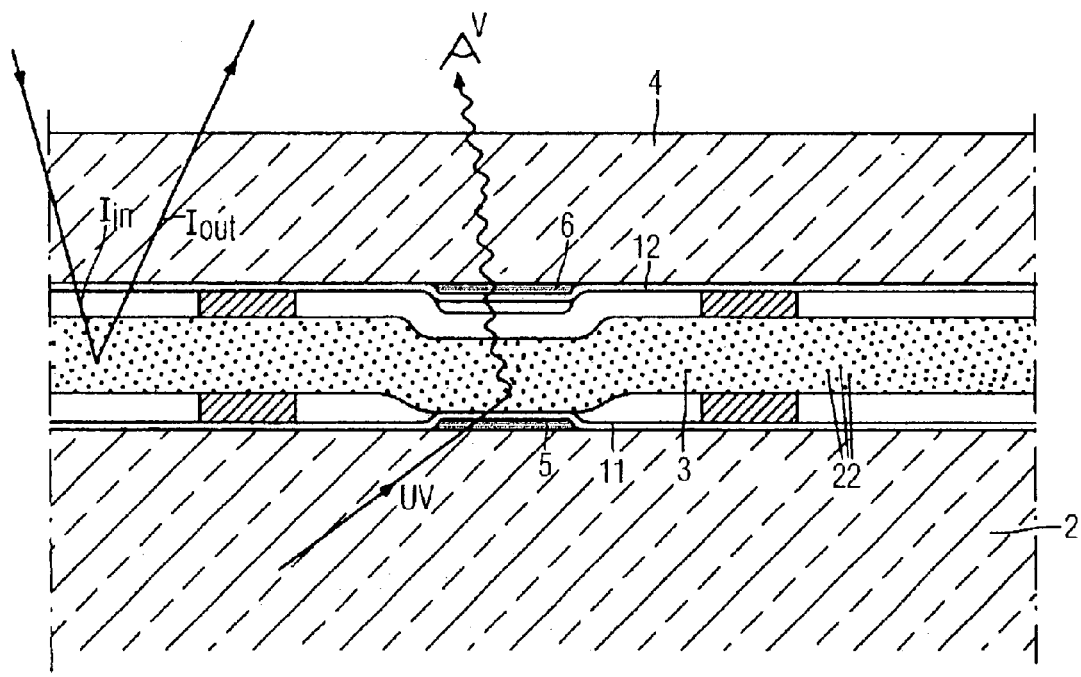
FIG. 4 illustrates an embodiment of the second aspect of the invention, i.e. a display device having phosphor particles in the movable element.

In embodiments of the invention, the difference in index of refraction between the material from which the scattering particles are made and the embedding material is larger for UV radiation than for visible light. The scattering efficiency (i.e. the amount of light scattered by the particles) is then larger for UV light than for visible light. Such a situation can be achieved by choosing a material for either the scattering particles or the embedding material, preferably for the scattering particles for which the optical band gap has smaller wavelengths but is close to the wavelength of UV light emitted by the UV source. The index of refraction close to an optical band gap is large and strongly dependent on the wavelength, leading to a much larger difference in index of refraction near the optical band gap than far remote from the optical band gap FIG. 4 shows an embodiment of another aspect of the invention. In this embodiment, the movable element 3 comprises UV-sensitive phosphor particles 22. When the movable element is in contact with the light guide 2, UV light enters the movable element 3 and is converted into visible light B seen by viewer V. This embodiment has a number of advantages:

It is simpler, because there is no need for color-determining elements 20.

In FIG. 3, at least some of the UV light exiting the movable element does not enter an element with phosphor particles. In FIG. 4, all (or at least a greater part) of the UV light entering movable element 4 enters an element having phosphor particles. Thus the portion of UV light converted is generally larger, so that fewer phosphor particles are needed, reducing unwanted scattering of visible light by the phosphor particles.

Many materials absorb at least some UV light. On average, compared to the embodiment of FIG. 3, the UV light has to traverse less of movable element 3 and or/of color determining element 20. Thus, a wider range of materials is suitable for movable element 3.

The reflection of light on the outer surface of movable element 3 (the surface facing electrode 6) is generally larger for UV light than for visible light.

In preferred embodiments, the movable element is also provided with absorbing materials to absorb light of colors different from those emitted by the phosphor particles. The parts of the movable element having red light-emitting phosphor particles are therefore preferably provided with materials such as pigments to absorb green and/or blue light. This increases the contrast.

Figure 5:
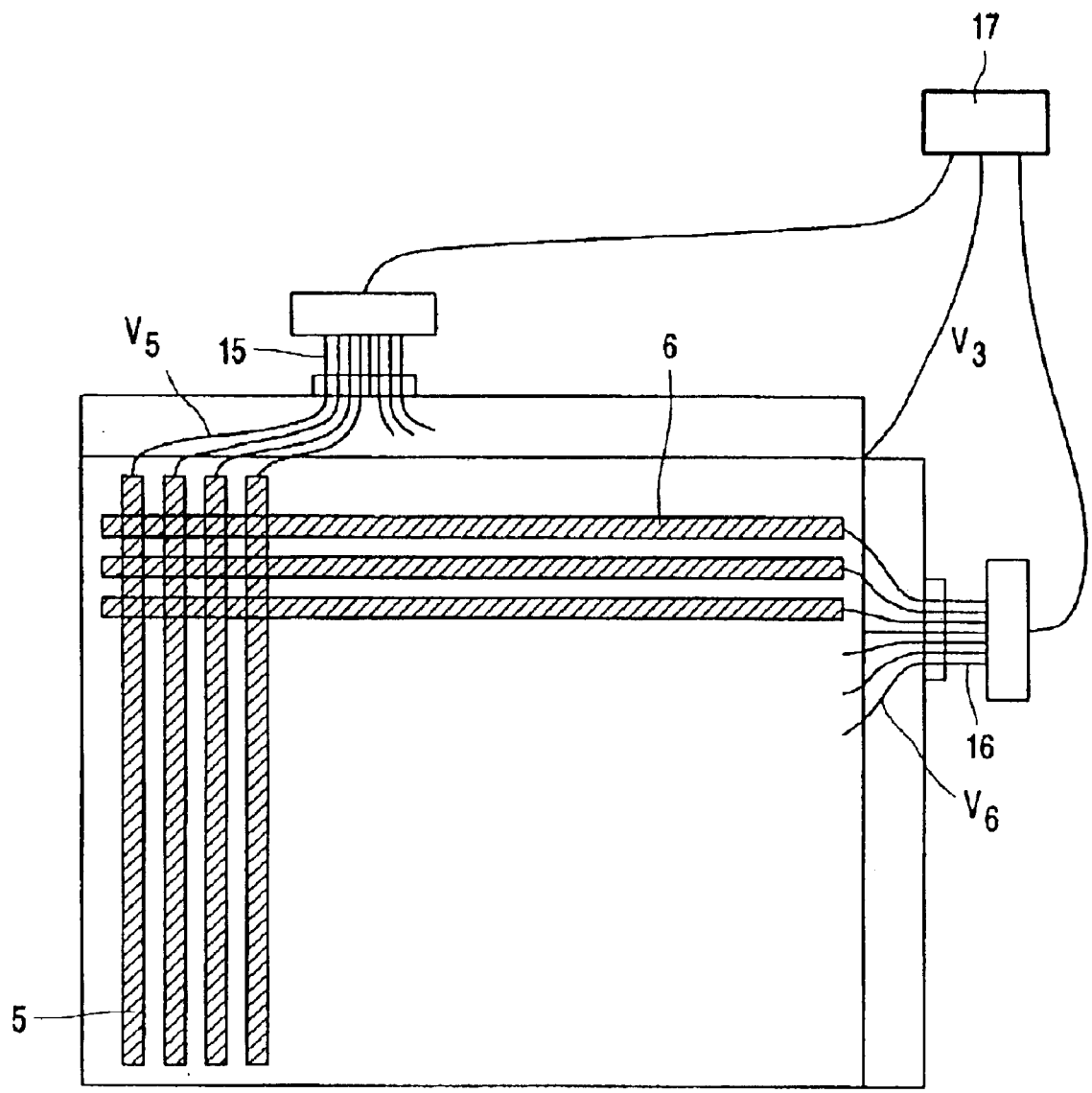
FIG. 5 is a plan view of the display device shown in FIG. 1, showing how the display device is driven.

FIG. 5 is a plan view of an embodiment of the display device shown in FIG. 11. The electrodes 5 and 6 form a matrix structure. From a control unit 17, which comprises selection means, selection signals (electric voltages) are supplied to the electrodes 5 and 6 via connections 15 and 16. This set of selection signals determines the potentials $V_5$ and $V_6$ on the electrodes 5 and 6, which are preferably covered by an insulation layer. Furthermore, a voltage $V_3$ can be applied to the element 3. By applying suitable potential differences to the electrodes 5 and 6 and element 3, the movable element 3 can be actuated, in operation, from and to the electrodes 5 and 6 at the location of selected crossings of the electrodes 5 and 6. In this example, electrodes 5 form column electrodes, i.e. electrodes extending in the 'short' direction of the rectangular display, while electrodes 6 form the row or line electrodes, i.e. electrodes extending in the 'long' direction of the rectangular display.

In summary, the invention can be described as follows. A display device is provided with a source for UV radiation wherein the UV radiation is led into a light guide, and at addressed position(s) where a movable element makes contact with the light guide, the UV light exits the light guide and enters the movable element. In a first aspect of the invention, the phosphor elements comprise phosphor particles which are embedded in a matrix material and preferably have a small size. In a second aspect of the invention, the movable element is provided with scattering particles which scatter more efficiently in UV light than the visible light. Scattered UV light impinges on UV-sensitive phosphor elements. In alternative embodiments, the movable element is provided with phosphor particles embedded in the material of the movable element. In all aspects, pigment particles (preferably with an average particle size$<\lambda/\pi$) are provided.

What is claimed is:

1. A display device comprising:
   an ultraviolet light (UV light) source;
   a light guide;
   a movable element;
   phosphor elements, including phosphor particles in an embedding material, that emit visible light at different colors when excited by UV light; and
   electrodes arranged so that electric voltages applied to the electrodes can generate an electric field to move the movable element into contact with the light guide to couple light out of the light guide,
   wherein the particles in the embedding material have a greater scattering efficiency for UV light emitted by the source than for light in the visible range.

2. A display device comprising:

a light source that produces UV light;

a light guide;

a movable element including particles in an embedding material that scatter light;

phosphor elements that emit visible light at different colors when excited by UV light; and electrodes arranged so that electric voltages applied to the electrodes can generate an electric field to move the movable element into contact with the light guide to couple light out of the light guide.

3. The display device of claim 2, wherein the scattering efficiency of the particles is at least twice as great for the UV light emitted by the source as for visible light.

4. The display device of claim 2, wherein the average size of the phosphor particles is smaller than $\lambda/\pi$, where $\lambda$ is the wavelength of the UV light emitted by the light source.

5. The display device of claim 4, wherein at least 90% of the particles are smaller than $\lambda/\pi$.

6. The display device of claim 4, wherein the average size of the particles is between $\lambda/6\pi$ and $\lambda/2\pi$.

7. The display device of claim 2, wherein the difference in index of refraction between the embedding material and the material of the scattering particles is larger for UV light than for visible light.

8. The display device of claim 1, including color filter elements.

9. A display device with a light source;

a light guide;

a movable element including particles in an embedding material that convert UV light into visible light; and electrodes arranged so that electric voltages applied to the electrodes can generate an electric field to move the movable element into contact with the light guide to couple light out of the light guide.

10. The display device of claim 9, wherein the average size of the particles is smaller than $\lambda/\pi$, where $\lambda$ is the wavelength of the light emitted by the light source.

11. The display device of claim 10, wherein the particles have an average size between $\lambda/6\pi$ and $\lambda/2\pi$.

12. The display device of claim 1, wherein the average size of the phosphor particles is smaller than $\lambda/\pi$, where $\lambda$ is the wavelength of the UV light emitted by the light source.

13. The display device of claim 12, wherein at least 90% of the phosphor particles are smaller than $\lambda/\pi$.

14. The display device of claim 12, wherein the average size of the phosphor particles is between $\lambda/6\pi$ and $\lambda/2\pi$.

* * * * *